(12) United States Patent
Ishida

(10) Patent No.: US 10,824,094 B2
(45) Date of Patent: Nov. 3, 2020

(54) SPEED REDUCTION DEVICE, DEVELOPMENT DEVICE AND IMAGE FORMING APPARATUS

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/656,757

(22) Filed: Oct. 18, 2019

(65) Prior Publication Data

US 2020/0133165 A1 Apr. 30, 2020

(30) Foreign Application Priority Data

Oct. 29, 2018 (JP) .................................. 2018-203190

(51) Int. Cl.
| | | |
|---|---|---|
| G03G 15/00 | (2006.01) | |
| F16H 1/28 | (2006.01) | |
| G03G 15/08 | (2006.01) | |
| F16H 1/32 | (2006.01) | |

(52) U.S. Cl.
CPC .......... G03G 15/0889 (2013.01); F16H 1/32 (2013.01); G03G 15/5008 (2013.01); F16H 2001/2881 (2013.01)

(58) Field of Classification Search
CPC ........... G03G 15/0889; G03G 15/5008; G03G 15/757; F16H 1/32; F16H 2001/2881
See application file for complete search history.

(56) References Cited

U.S. PATENT DOCUMENTS

2010/0097745 A1* 4/2010 Saitou ................... F16H 1/32
361/679.01
2014/0056618 A1* 2/2014 Matsuda .............. G03G 15/757
399/167

FOREIGN PATENT DOCUMENTS

| JP | S62101943 A | 5/1987 |
| JP | H02186148 A | 7/1990 |

* cited by examiner

*Primary Examiner* — Sophia S Chen
(74) *Attorney, Agent, or Firm* — Studebaker & Brackett PC

(57) ABSTRACT

A speed reduction device includes an input shaft, a fixed internal gear, an output internal gear and a planetary two-stage gear. The fixed internal gear is fixed on the input shaft. The output internal gear is rotatably disposed on the same axis as the fixed internal gear and has a different number of teeth from the fixed internal gear. The planetary two-stage gear is supported by the input shaft so as to be rotatable around an eccentric shaft. The planetary two-stage gear has a large diameter gear and a small diameter gear which are respectively meshed with the fixed internal gear and the output internal gear. A difference in number of teeth between the large diameter gear and the small diameter gear is equal to a difference in number of teeth between the fixed internal gear and the output internal gear.

6 Claims, 4 Drawing Sheets

SPEED REDUCTION DEVICE, DEVELOPMENT DEVICE AND IMAGE FORMING APPARATUS

INCORPORATION BY REFERENCE

This application is based on and claims the benefit of priority from Japanese patent application No. 2018-203190 filed on Oct. 29, 2018, which is incorporated by reference in its entirety.

BACKGROUND

The present disclosure relates to a speed reduction device which reduces a rotational speed of an input shaft and then transmits the speed reduced rotation to an output shaft, a development device including the speed reduction device and an image forming apparatus.

The development device is provided with a speed reduction device which reduces the rotation speed of the motor and then transmits the speed reduced rotation to an agitation screw agitating a developer.

The speed reduction device is sometimes configured to rotate a planetary gear meshed with a sun internal gear with a crank shaft. Alternatively, a speed reduction device is sometimes configured to include coaxially disposed first and second gears one of which is a profile shifted gear, a drive disk rotating around the same axis as the first and second gears, and a planetary gear rotatable around a shaft fixed to the drive disk and revolving while meshed with the first and second gears.

However, in the former speed reduction device, although a high reduction ratio is obtained, because only a rotation component of the planetary gear is employed for reduction, a wide space is required and a number of members is increased. In the later speed reduction device, it is required to devise a supporting structure for the drive disk and the planetary gear. Additionally, because the planetary gear rotates around the first and second gears, a wide space is required.

SUMMARY

In accordance with an aspect of the present disclosure, a speed reduction device includes an input shaft, a fixed internal gear, an output internal gear and a planetary two-stage gear. The input shaft rotates by a drive force. The fixed internal gear is fixed on the input shaft. The output internal gear is rotatably disposed on the same axis as the fixed internal gear and has a different number of teeth from the fixed internal gear. The planetary two-stage gear is supported by the input shaft so as to be rotatable around an eccentric shaft parallel to the input shaft. The planetary two-stage gear has a large diameter gear and a small diameter gear which are respectively meshed with the fixed internal gear and the output internal gear. A difference in number of teeth between the large diameter gear and the small diameter gear is equal to a difference in number of teeth between the fixed internal gear and the output internal gear. When the input shaft is rotated, the outer diameter gear is meshed with the fixed internal gear, the planetary two-stage gear is revolved around the input shaft while rotating around the eccentric shaft, and the small diameter gear rotates the output internal gear.

In accordance with an aspect of the present disclosure, a development device includes an agitation screw and the speed reduction device. The agitation screw agitates a developer containing a toner. A rotational force is transmitted from the output internal gear of the speed reduction device to the agitation screw.

In accordance with an aspect of the present disclosure, an image forming apparatus includes a photosensitive drum on which an electrostatic latent image is formed and the development device developing the electrostatic latent image with the toner.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, a speed reduction device, a development device and an image forming apparatus according to an embodiment of the present disclosure will be described with reference to the drawings.

Figure 1:
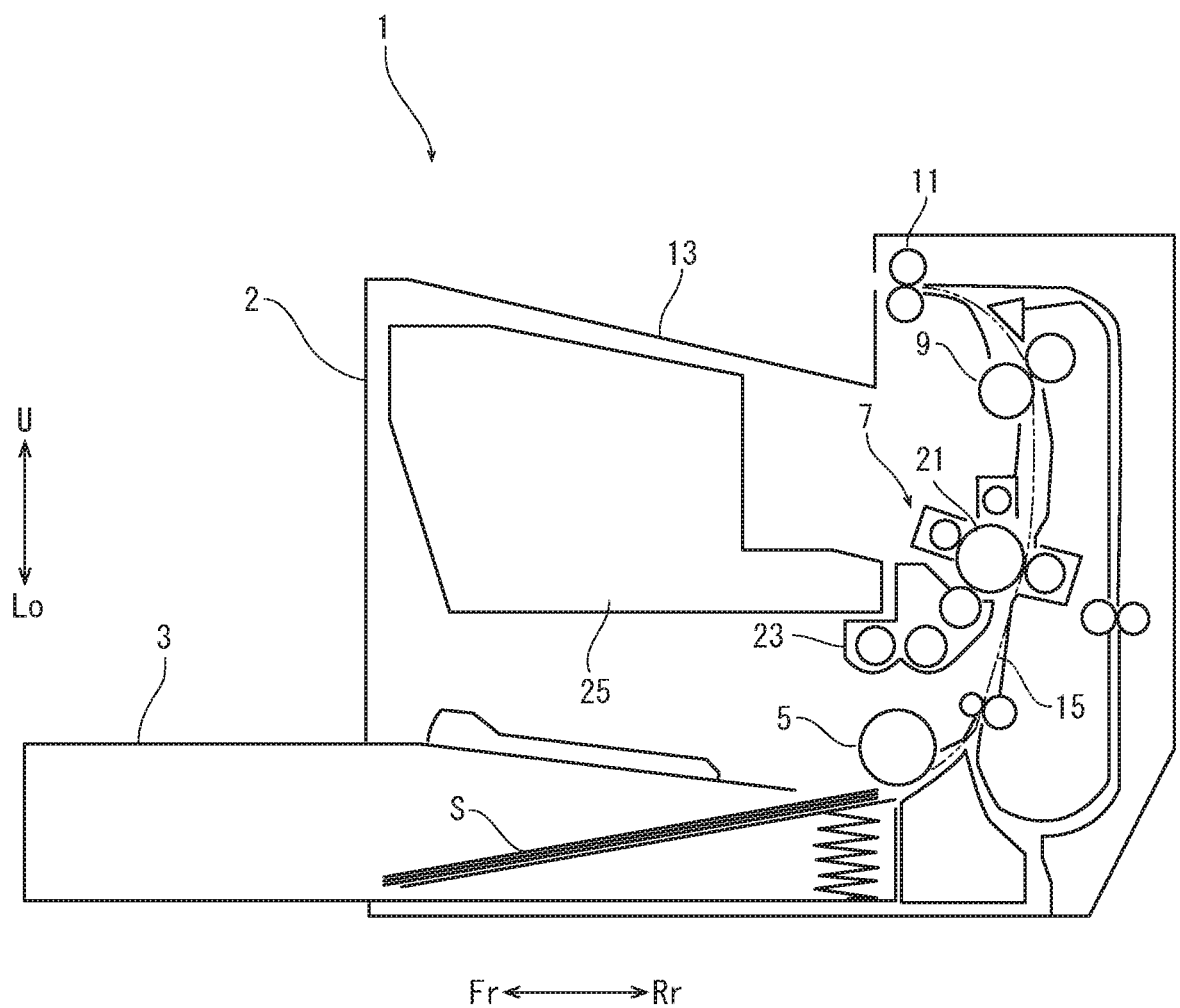
FIG. 1 is a front view schematically showing an inner structure of a printer according to one embodiment of the present disclosure.

Firstly, with reference to FIG. 1, an entire structure of a printer 1 as the image forming apparatus will be described. FIG. 1 is a view schematically showing the printer according to one embodiment of the present disclosure. In the following description, a left side on a paper surface in FIG. 1 is defined as a front side of the printer 1. In each figure, Fr, Rr, L, R, U and Lo respectively show a front side, a rear side, a left side, a right side, an upper side and a lower side of the printer 1.

An apparatus main body 2 of the printer 1 is provided with a sheet feeding cassette 3 in which a sheet S is stored, a sheet feeding device 5 which feeds the sheet S from the sheet feeding cassette 3, an image forming part 7 which forms a toner image to the sheet S, a fixing device 9 which fixes the toner image to the sheet S, a discharge device 11 which discharges the sheet S to which the toner image is fixed and a discharge tray 13 on which the discharged sheet S is stacked. In the apparatus main body 2, a conveyance path 15 for the sheet S is formed from the sheet feeding device 5 through the image forming part 7 and the fixing device 9 to the discharge device 11.

The image forming part 7 includes a rotatable photosensitive drum 21 on which an electrostatic latent image is formed, a development device 23 which develops the electrostatic latent image formed on the photosensitive drum 21 to the toner image and a toner container 25.

Figure 2:
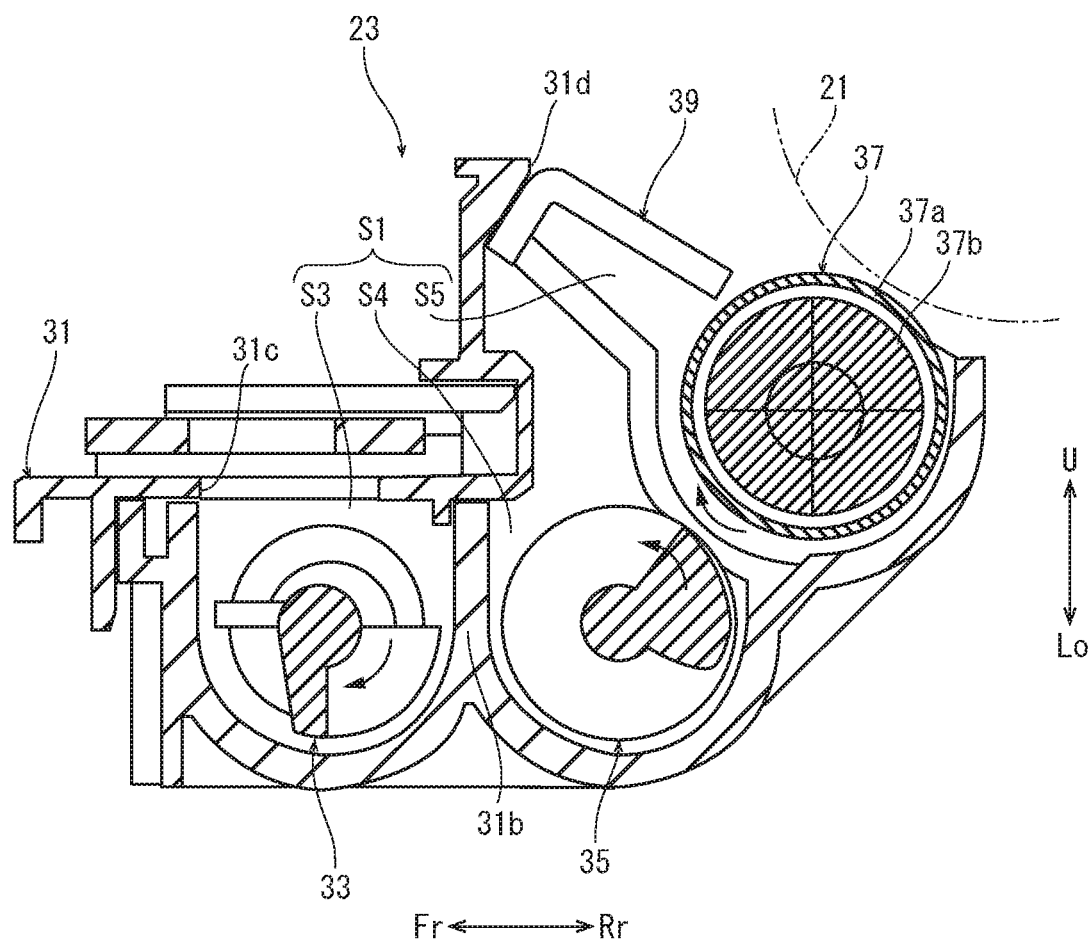
FIG. 2 is a cross sectional view showing a development device according to the embodiment of the present disclosure.
Figure 3:
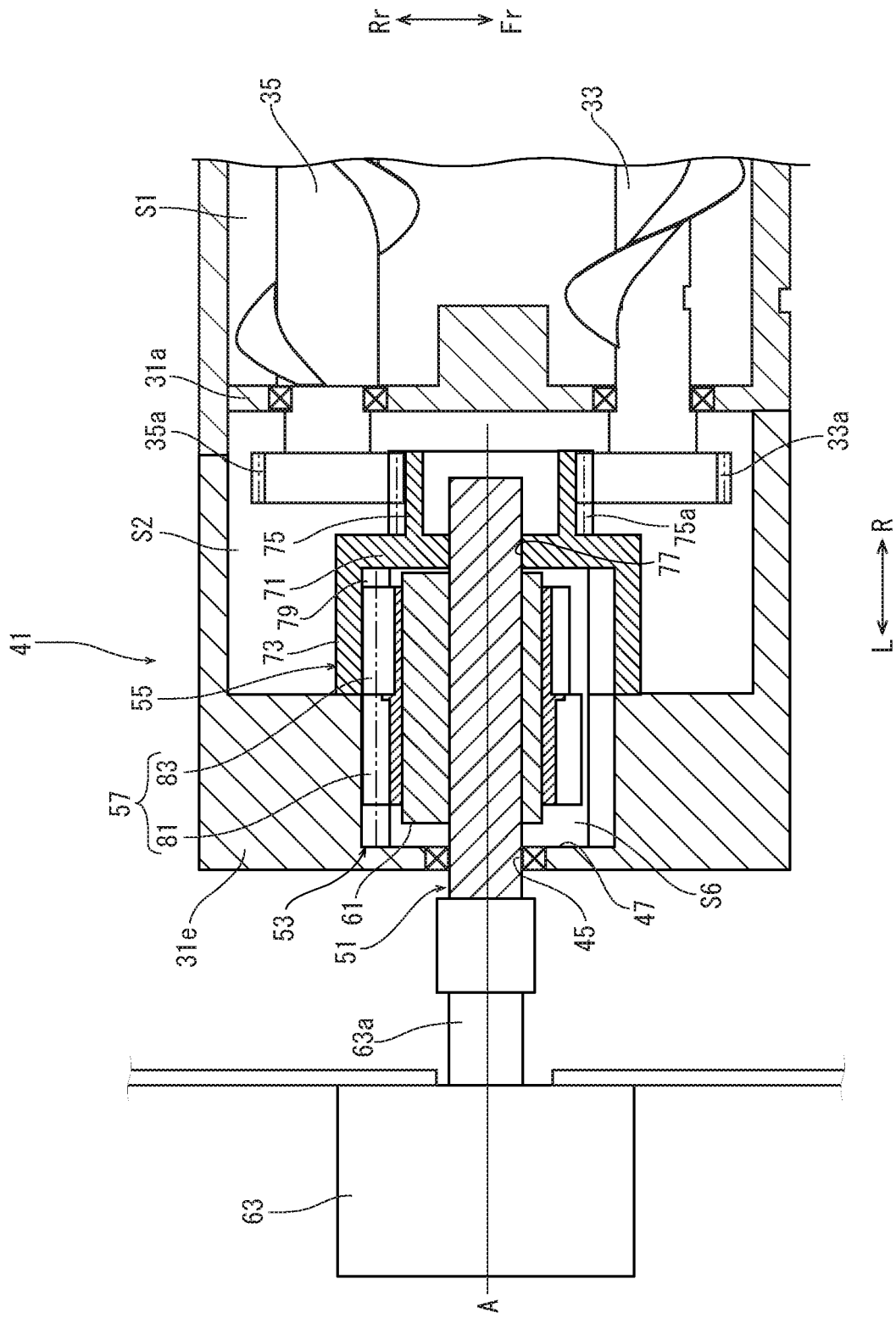
FIG. 3 is a cross sectional view showing a speed reduction device according to the embodiment of the present disclosure.

Next, the development device 23 will be described with reference to FIG. 2 and FIG. 3. FIG. 2 is a cross sectional view showing the development device and FIG. 3 is a cross sectional view showing a speed reduction device.

The development device 23 includes a development housing 31, a first agitation screw 33, a second agitation screw 35, a development roller 37, a regulation member 39, a speed reduction device 41 (refer to FIG. 3) which rotates the first agitation screw 33 and the second agitation screw 35.

The development housing 31 has a hollow space long in the rotational axis direction of the photosensitive drum 21 (the left-and-right direction of the printer 1). As shown in FIG. 3, in the hollow space, a developer storage chamber S1 and a gear storage chamber S2 are formed. The developer storage chamber S1 stores a developer containing a toner and a carrier. The gear storage chamber S2 is disposed at one end (the left end) of the developer storage chamber S1 in the rotational axis direction. The gear storage chamber S2 stores the speed reduction device 41. The developer storage chamber S1 and the gear storage chamber S2 are divided by a partition wall 31a. As shown in FIG. 2, in the developer storage chamber S1, a first agitation chamber S3, a second agitation chamber S4 and a development roller storage chamber S5 are formed along the rotational axis direction.

The first agitation chamber S3 is disposed on a side far from the photosensitive drum 21 and the second agitation chamber S4 is disposed on a side near the photosensitive drum 21. The first agitation chamber S3 and the second agitation chamber S4 are divided by a partition wall 31b. The partition wall 31b has passing ports (not shown) at the end portions in the rotational axis direction. A toner replenishment port 31c is formed in the upper wall of the first agitation chamber S3. Through the toner replenishment port 31c, the toner is replenished to the first agitation chamber S3 from the toner container 25.

The development roller storage chamber S5 is disposed on an oblique upper side of the second agitation chamber S4. The development roller storage chamber S5 has an opening 31d facing the photosensitive drum 21.

With reference to FIG. 3 again, the end wall 31e of the gear storage chamber S2 has a through hole 45. The end wall 31e has a circular recess 47 around the through hole 45.

With reference to FIG. 2, the first agitation screw 33 is rotatably stored in the first agitation chamber S3. As shown in FIG. 3, one end portion of the first agitation screw 33 penetrates through the partition wall 31a and protrudes into the gear storage chamber S2. To the one end portion protruding into the gear storage chamber S2, an input gear 33a is fixed. The second agitation screw 35 is rotatably stored in the second agitation chamber S4. As shown in FIG. 3, one end portion of the second agitation screw 35 penetrates through the partition wall 31a and protrudes into the gear storage chamber S2. To the one end portion protruding into the gear storage chamber S2, an input gear 35a is fixed.

The development roller 37 has a cylindrical sleeve 37a rotatably supported and a columnar magnet roller 37b stored in the sleeve 37a and fixed non-rotatably. The sleeve 37a is made of nonmagnetic material. The magnet roller 37b has a plurality of poles along the circumferential direction. The magnetic force of the magnetic roller 37b holds the developer on the outer circumferential face of the sleeve 37a.

The development roller 37 is stored in the development roller storage chamber S5, and a part of the development roller 37 is exposed through the opening 31d. The sleeve 37a is rotated in the clockwise direction in FIG. 2. The magnetic roller 37b is fixed such that each pole is arranged at a predetermined position in the circumferential direction.

The regulation member 39 is a member long in the rotational axis direction and has a L-shaped cross section. The regulation member 39 is disposed in the opening 31d of the development roller storage chamber S5 via a predetermined interval from the development roller 37, and fixed to the development housing 31.

Figure 4:
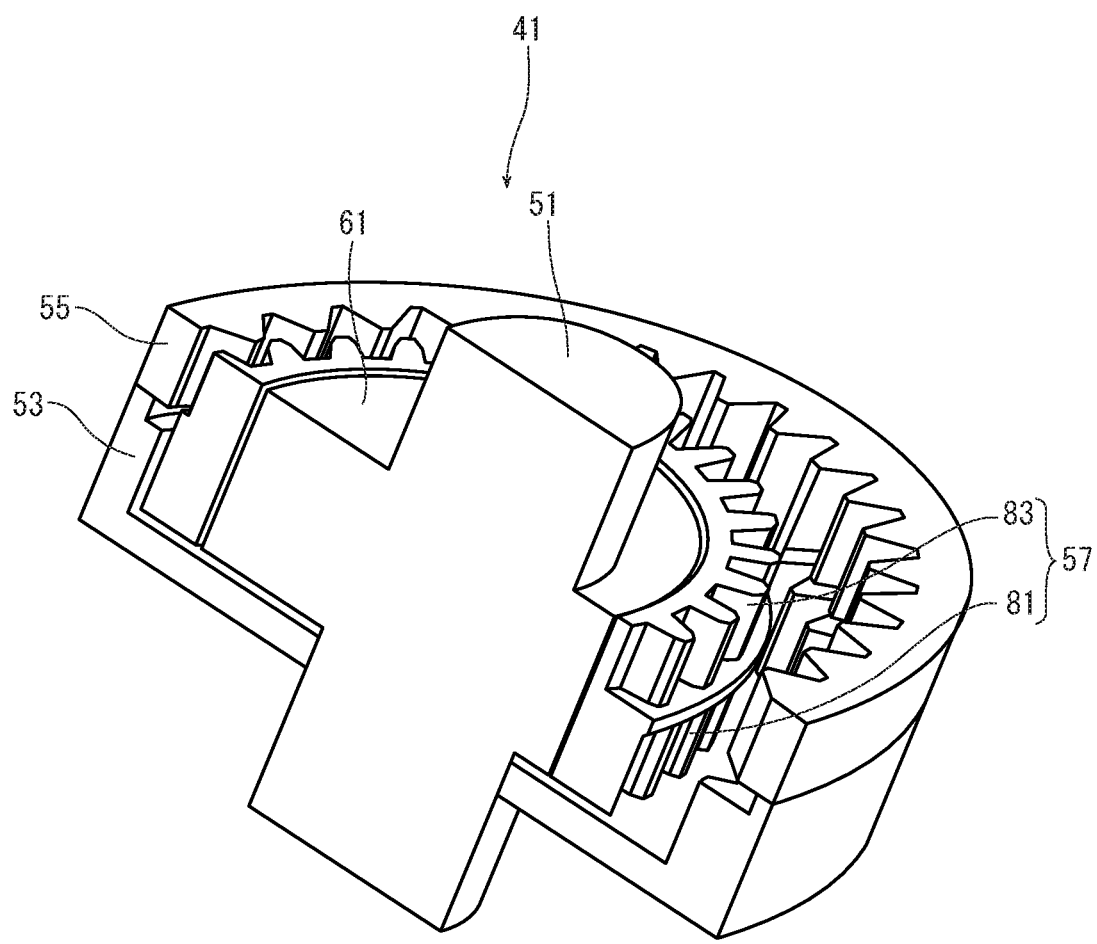
FIG. 4 is a perspective view showing a part of the speed reduction device according to the embodiment of the present disclosure.

Next, with reference to FIG. 3 and FIG. 4, the speed reduction device 41 will be described. FIG. 4 is a perspective view showing a part of the speed reduction device.

The speed reduction device 41 includes an input shaft 51, a fixed internal gear 53 and an output internal gear 55 which are disposed on the same rotational axis A as the input shaft 51 and a planetary two-stage gear 57 supported by the input shaft 51. As described above, the speed reduction device 41 is stored in the gear storage chamber S2 of the development housing 31.

The input shaft 51 has an eccentric shaft 61 parallel to the input shaft 51. The eccentric shaft 61 is fixed to almost the longitudinal center portion of the input shaft 51. One end portion of the input shaft 51 is passed through the through hole 45 of the end wall 31e of the gear storage chamber S2 and protrudes outside the development housing 31. The protruded end portion is coupled to an output shaft 63a of a motor 63 as a drive source with a coupling. The input shaft 51 is driven by the motor 63 to be rotated around the rotational axis A.

The fixed internal gear 53 is formed on the circumferential face of the recess 47 of the gear storage chamber S2 around the through hole 45. In other words, the fixed internal gear 53 is formed around the rotational axis A. A number of teeth of the fixed internal gear 53 is 37 or larger (for example, 100).

The output internal gear 55 is a bottomed cylindrical member, and has a disk-shaped bottom wall 71, a cylindrical side wall 73 and a cylindrical output cylinder 75. The bottom wall 71 has an opening 77 at the center portion. The side wall 73 is formed along the outer circumference of one face of the bottom wall 71 around the opening 77. On the inner circumferential face of the side wall 73, an internal gear 79 is formed around the opening 77. A number of teeth of the internal gear 79 is less than a number of teeth of the fixed internal gear 53 by 1 (one). Preferably, a number of teeth of the internal gear 79 is larger than 37 (for example, 99). The output cylinder 75 is formed on the other face of the bottom wall 71 around the opening 77. On the outer circumferential face of the output cylinder 75, a drive gear 75a is formed. The drive gear 75a is capable of meshing with the input gears 33a and 35a fixed to the first and second agitation screws 33 and 35.

Through the opening 77 of the bottom wall 71, the other end portion of the input shaft 51 is penetrated. Thereby, the output internal gear 55 and the fixed internal gear 53 are disposed on the same rotational axis A as the input shaft 51. The end face of the side wall 73 comes into contact with the end wall 31e of the gear storage chamber S2, and a space surrounded by the side wall 73 and the bottom wall 71 of the output internal gear 55 is communicated with the recess 47 of the end wall 31e. The communicated space S6 is isolated from the outside (the gear storage chamber S2). The drive gear 75a of the output cylinder 75 is meshed with the input gears 33a and 35a fixed to the first and second agitation screws 33 and 35. The output internal gear 55 is prevented from being slipped off from the input shaft 51 by a C-ring (not shown).

The planetary two-stage gear 57 is a two-stage gear having a large diameter gear 81 and a small diameter gear 83 which are capable of meshing with the fixed internal gear 53 and the internal gear 79 of the output internal gear 55 respectively. A difference in a number of teeth between the large diameter gear 81 and the small diameter gear 83 is equal to a difference in a number of teeth between the fixed internal gear 53 and the internal gear 79 of the output internal gear 55 (in this embodiment, the difference is 1 (one)). A number of teeth of the large diameter gear 81 is larger than a half of a number of teeth of the fixed internal gear 53, and a number of teeth of the small diameter gear 83 is larger than a half of a number of teeth of the internal gear 79 of the output internal gear 55. For example, a number of teeth of the large diameter gear 81 is 80 (eighty), and a number of teeth of the small diameter gear 83 is 79 (seventy nine).

The planetary two-stage gear 57 is rotatably supported by the eccentric shaft 61 of the input shaft 51. The planetary two-stage gear 57 is stored in the communicated space S6, and the large diameter gear 81 and the small diameter gear 83 are meshed with the fixed internal gear 53 and the internal gear 79 of the output internal gear 55, respectively.

A speed reduction operation of the speed reduction device 41 and a development operation of the development device 23 having the above configuration will be described. When the input shaft 51 is driven by the motor 63 to be rotated around the rotational axis A, the eccentric shaft 61 is moved along an orbit around the rotational axis A. Then, as shown in FIG. 4, the large diameter gear 81 and the small diameter gear 83 of the planetary two-stage gear 57 rotatably supported by the eccentric shaft 61 are respectively meshed with the fixed internal gear 53 and the internal gear 79 of the output internal gear 55, and the planetary two-stage gear 57 revolves around the rotational axis A while rotating around the eccentric shaft 61. Because the fixed internal gear 53 is not rotatable, the output internal gear 55 is rotated with respect to the fixed internal gear 53 by the rotation of the planetary two-stage gear 57. In detail, the output internal gear 55 is rotated with respect to the fixed internal gear 53 depending on a difference (in this embodiment, 0.25) between a number of meshed teeth ((100/80)×79=98.75) of the small diameter gear 83 with the internal gear 79 when the planetary two-stage gear 57 is revolved by one round (when the input shaft 51 is rotated once) and a number of teeth (99) of the internal gear 79. In this embodiment, because the difference in number of the teeth is 0.25, when the planetary two-stage gear 57 is revolved by one round, the output internal gear 55 is rotated by 0.25 tooth.

When a number of teeth of the fixed internal gear 53 is set to Za, a number of teeth of the internal gear 79 of the output internal gear 55 is set to Zb, a number of teeth of the large diameter gear 81 of the planetary two-stage gear 57 is set to Zda and a number of teeth of the small diameter gear 83 of the planetary two-stage gear 57 is set to Zdb, a reduction rate W is defined as follows:

$$W=-0.1/(Za/Zda \cdot Zdb/Zb-1).$$

For example, when a number Za of teeth of the fixed internal gear 53 is set to 100, a number Zb of teeth of the internal gear 79 of the output internal gear 55 is set to 99, a number Zda of teeth of the large diameter gear 81 is set to 80 and a number Zdb of teeth of the small diameter gear 83 is set to 79, a reduction rate W is $-0.1/(Za/Zda \cdot Zdb/Zb-1)$ $=-0.1/(100/80 \cdot 79/99-1)=396$. That is, when the input shaft 51 is rotated by 396 rounds, the output internal gear 55 is rotated by one round.

When the rotation of the motor 63 is reduced by the speed reduction device 41 as described above and the output internal gear 55 is rotated at the reduced speed, the first agitation screw 33 and the second agitation screw 35 are rotated through the input gears 33a and 35a which are meshed with the drive gear 75a of the output cylinder 75.

Then, the toner replenished in the first agitation chamber S3 is agitated together with the carrier while conveyed between the first agitation chamber S3 and the second agitation chamber S4 through the passing ports of the partition wall 31b. As a result, the toner is agitated to be charged.

The developer containing the charged toner is brought up on the surface of the sleeve 37a by the magnet roller 37b of the development roller 37 and held by the sleeve 37a. Then, the developer is conveyed by the rotation of the sleeve 37a. After a thickness of the developer layer on the sleeve 37a is regulated by the regulation member 39, the developer is conveyed to a position facing the photosensitive drum 21 and develops the electrostatic latent image on the photosensitive drum 21 with the toner.

As described above, according to the speed reduction device 41 of the present disclosure, using the fixed internal gear 53, the output internal gear 55 and the planetary two-stage gear 57 makes it possible to obtain a high reduction rate and to make the speed reduction device 41 small. Compared with the above described conventional speed reduction device having the same principle as the present disclosure and including coaxially disposed first and second gears one of which is a profile shifted gear, the drive disk rotating around the same axis as the first and second gears, and the planetary gear rotatable around the shaft fixed to the drive disk and revolving while meshed with the first and second gears, although a number of the members is four in both the devices, the conventional speed reduction device requires a space around the first and second gears by a diameter of the planetary gear. Then, the above described conventional device requires a space wider than the speed reduction device 41 of the present disclosure.

Additionally, a difference in number of teeth between the large diameter gear 81 and the small diameter gear 83 of the planetary two-stage gear 57 is equal to a difference in number of teeth between the fixed internal gear 53 and the internal gear 79 of the output internal gear 55 so that a difference in radius between the meshed gears is made to be the same, and it becomes possible to mesh the gears each other surely without using the profile shifting.

A number of teeth of each of the large diameter gear 81 and the small diameter gear 83 is larger than a half of a number of teeth of each of the fixed internal gear 53 and the internal gear 79 of the output internal gear 55, respectively. In this case, it becomes possible to obtain a high reduction rate without using the profile shifted gear. A conventionally used gear has a pressure angle of 20°. In the case of the gear having a pressure angle of 20°, in order to prevent an interface of the internal gear with a spur gear (a planetary gear), it is required to make a difference in teeth larger than 18. Accordingly, a number of teeth of each of the fixed internal gear 53 and the internal gear 79 of the output internal gear 55 is larger than 37 so that it becomes possible to rotate the planetary two-state gear 57 smoothly.

Additionally, according to the development device 23 of the present disclosure, it becomes possible to transmit the rotation of the motor 63 to the first and second agitation screws 33 and 35 with a high reduction rate. Furthermore, the speed reduction device 41 is small in size so that the development device 23 is made to be small. Furthermore, the planetary two-stage gear 57 is stored inside the fixed internal gear 53 and the output internal gear 55 (the space S6) so that it becomes possible to isolate the fixed internal gear 53, the internal gear 79 of the output internal gear 55 and the planetary two-stage gear 57 from the outside. Then, even if the speed reduction device 41 is disposed in an area where the toner scattering easily occurs, because the scattered toner hardly enters the space S6, it becomes possible to prevent a meshing failure and a damage of the gears.

The configuration of the development device 23 is not limited to the embodiment. Between the output shaft 63a of the motor 63 and the input shaft 51 of the speed reduction device 41, or, between the drive gear 75a of the speed reduction device 41 and the input gears 33a and 35a of the first and second agitation screws 33 and 35, another speed reduction device may be disposed. In order to transmit the rotation of the output internal gear 55 to the agitation screws 33 and 35, the present embodiment employs the output cylinder 75 formed on the output internal gear 55; however, another configuration may be employed.

The speed reduction device 41 may be applied to the photosensitive drum 21 and the rotating member of the fixing device 9 in addition to the development device 23.

Although the present disclosure described the specific embodiment, the present disclosure is not limited to the embodiment. It is to be noted that one skilled in the art can modify the embodiment without departing from the scope and spirit of the present disclosure.

The invention claimed is:

1. A speed reduction device comprising:
an input shaft rotating by a drive force;
a fixed internal gear fixed on the input shaft;
an output internal gear rotatably disposed on a same axis as the fixed internal gear and having a different number of teeth from the fixed internal gear; and
a planetary two-stage gear supported by the input shaft so as to be rotatable around an eccentric shaft parallel to the input shaft, the planetary two-stage gear having a large diameter gear and a small diameter gear which are respectively meshed with the fixed internal gear and the output internal gear, a difference in number of teeth between the large diameter gear and the small diameter gear being equal to a difference in number of teeth between the fixed internal gear and the output internal gear,
wherein when the input shaft is rotated, the large diameter gear is meshed with the fixed internal gear, the planetary two-stage gear is revolved around the input shaft while rotating around the eccentric shaft, and the small diameter gear rotates the output internal gear.

2. The speed reduction device according to claim 1,
wherein a number of teeth of the large diameter gear is larger than a half of a number of teeth of the fixed internal gear, and
a number of teeth of the small diameter gear is larger than a half of a number of teeth of the output internal gear.

3. A development device comprising:
an agitation screw agitating a developer containing a toner; and
the speed reduction device according to claim 1,
wherein a rotational force is transmitted from the output internal gear of the speed reduction device to the agitation screw.

4. The development device according to claim 3, comprising a development housing in which the agitation screw is stored,
wherein the fixed internal gear is formed around a circumferential face of a circular recess formed on an end wall of the development housing.

5. The development device according to claim 4,
wherein the output internal gear has:
a disk-shaped bottom wall;
a cylindrical side wall formed on one face of the bottom wall;
an internal gear formed around an inner circumferential face of the side wall and meshed with the small diameter gear of the planetary two-stage gear;
a cylindrical output cylinder formed on the other face of the bottom wall; and
a drive gear formed around an outer circumferential face of the output cylinder and meshed with an input gear of the agitation screw,
wherein a space surrounded by the bottom wall and the side wall is communicated to the recess to form a closed space.

6. An image forming apparatus comprising:
a photosensitive drum on which an electrostatic latent image is formed; and
the development device according to claim 3, developing the electrostatic latent image with the toner.

* * * * *